(12) United States Patent
Sugita et al.

(10) Patent No.: US 9,180,512 B2
(45) Date of Patent: Nov. 10, 2015

(54) PRODUCTION SYSTEM AND PRODUCTION METHOD OF ALUMINUM ALLOY BILLET, AND ALUMINUM ALLOY BILLET

(75) Inventors: Kaoru Sugita, Fuji (JP); Takeshi Fujita, Fuji (JP); Mikio Kubota, Shizuoka (JP); Noriyuki Ueno, Toyota (JP); Takehito Kobayashi, Miyoshi (JP)

(73) Assignees: NIPPON LIGHT METAL COMPANY, LTD., Shinagawa-Ku, Tokyo (JP); TOYOTA JIDOSHA KABUSHIKI KAISHA, Toyota-Shi, Aichi (JP)

( * ) Notice: Subject to any disclaimer, the term of this patent is extended or adjusted under 35 U.S.C. 154(b) by 1147 days.

(21) Appl. No.: 13/145,407

(22) PCT Filed: Jan. 21, 2010

(86) PCT No.: PCT/JP2010/050696
§ 371 (c)(1),
(2), (4) Date: Jul. 20, 2011

(87) PCT Pub. No.: WO2010/084907
PCT Pub. Date: Jul. 29, 2010

(65) Prior Publication Data
US 2011/0300397 A1    Dec. 8, 2011

(30) Foreign Application Priority Data

Jan. 21, 2009 (JP) .................... 2009-011401

(51) Int. Cl.
*B22D 11/00* (2006.01)
*B22D 2/00* (2006.01)
(Continued)

(52) U.S. Cl.
CPC ............. *B22D 11/003* (2013.01); *B22D 2/00* (2013.01); *B22D 11/16* (2013.01); *B22D 46/00* (2013.01);
(Continued)

(58) Field of Classification Search
CPC ..... B22D 2/00; B22D 11/141; B22D 11/1233; B22D 11/126; B22D 11/163; Y10T 29/5184
USPC ......................................... 29/33 C
See application file for complete search history.

(56) References Cited

U.S. PATENT DOCUMENTS

2006/0254679 A1    11/2006 Odashima et al.

FOREIGN PATENT DOCUMENTS

| JP | 2003220452 A | 8/2003 |
| JP | 2004314176 A | 11/2004 |
| JP | 2005186119 A | 7/2005 |
| JP | 2005346460 A | 12/2005 |

(Continued)

OTHER PUBLICATIONS

Machine Translation of JP 2004-314176, which JP '176 was published Nov. 2004.*

(Continued)

*Primary Examiner* — Erica E Cadugan
(74) *Attorney, Agent, or Firm* — Young Basile Hanlon & MacFarlane P.C.

(57) ABSTRACT

An aluminum alloy billet obtained by continuously casting molten aluminum alloy in the shape of rod is cut into a predetermined length by means of a cutting device. The aluminum alloy billet thus cut is loaded into a product carrier container with an identification mark that has been made. The casting condition and inspection results of the aluminum alloy billet are stored in the storage unit of a production control device in association with the identification mark so as to stabilize the quality and production of the aluminum alloy billet used for machining materials.

28 Claims, 4 Drawing Sheets

(51) Int. Cl.
- *B22D 46/00* (2006.01)
- *G05B 19/418* (2006.01)
- *B22D 11/14* (2006.01)
- *B22D 11/16* (2006.01)
- *B22D 11/126* (2006.01)
- *B22D 11/12* (2006.01)

(52) U.S. Cl.
CPC ........ *G05B 19/41875* (2013.01); *B22D 11/126* (2013.01); *B22D 11/1233* (2013.01); *B22D 11/141* (2013.01); *B22D 11/163* (2013.01); *Y10T 29/5184* (2015.01); *Y10T 428/12229* (2015.01)

(56) References Cited

FOREIGN PATENT DOCUMENTS

| | | |
|---|---|---|
| JP | 2008116324 A | 5/2008 |
| JP | 2008200736 A | 9/2008 |

OTHER PUBLICATIONS

English translation of the International Preliminary Report on Patentability (Chapter I) for the corresponding International Application No. PCT/JP2010/050696, dated Aug. 18, 2011.

English Translation of Office Action for corresponding Chinese Patent Application 2010800003359.4, dated Jan. 22, 2013.

Office Action for corresponding Chinese Patent Application 2010800003359.4, dated Aug. 1, 2014, and its English translation.

* cited by examiner

PRODUCTION SYSTEM AND PRODUCTION METHOD OF ALUMINUM ALLOY BILLET, AND ALUMINUM ALLOY BILLET

TECHNICAL FIELD

The present invention relates to a manufacturing technique of aluminum alloy billet utilized for machining materials for automobile parts or aluminum sash.

BACKGROUND

Generally, the aluminum alloy billet utilized as machining materials, such as, for automobile parts and aluminum sash, is produced by casting molten aluminum alloy in the shape of rods, such as e.g., by DC casting, hot-top casting, hot-top gas pressure casting, and horizontal continuous casting, and then through long bar cutting process, homogenizing process, surfacing process, short bar cutting process, and defect inspection process.

Since ordinary DC casting makes it a rule to process in batch for every process the aluminum alloy billet is casted to a finite length, a long period of time is required until the final inspection. On that account, there is a drawback therein that it is prone to develop defective products, when a process failure occurs, and controlling at a low production rate so as not to break out any defective products lowers productivity. In contrast, the horizontal continuous casting obviates batch processing of the aluminum alloy billet in batch for every process, which is produced by continuously casting the molten aluminum alloy in the shape of rod. This enables manufacturing of the aluminum alloy billet without a decrease in the productivity.

Incidentally, the aluminum alloy billet yielded by casting the molten aluminum alloy might develop defects including a casting defect depending on the casting condition. Thus, for the aluminum alloy billet produced by casting the molten aluminum alloy to be cut into a predetermined length for shipment as a product, it is necessary to inspect the product for a defect in the aluminum alloy billet to control the quality thereof. Hereupon, as techniques of controlling the quality of the aluminum alloy billet produced by continuously casting the molten aluminum alloy are widely known. One of the techniques is that a surface and the inside of the aluminum alloy billet undergo a nondestructive inspection and the quality of the aluminum alloy billet is controlled based on the inspection results. Another technique is that an ultrasonic flaw inspection is conducted to the aluminum alloy billet pulled out from the mold of the continuous casting device for control of the quality of the aluminum alloy billet.

Further, in the technique in which the billet is directly cut into a length of the product after being casted to the shape of a billet, there has thus far been no art of the management of production and inspection information or the feedback thereof to the manufacturing process.

SUMMARY

The control of the quality of the aluminum alloy billed with nondestructive inspection, however, entails a problem that since the nondestructive inspection is conducted after facing is applied by the facing device to the side of the aluminum alloy billet pulled out from the mold of the continuous casting device, the technology has a lower degree of freedom in the process design. Further, the technology involves a problem that since a large time lag is generated during the course of feedback of the inspection results to the casting process, it will become hard to effectively produce the aluminum alloy billet with consistent quality.

Meanwhile, ultrasonic flaw inspection cannot get a quick feedback because the correlation between the casting condition of the continuous casting system and the inspection result thereof is not made. Therefore, there are limits in striving for quality stability of the aluminum alloy billet because discrimination between a quality product and a defective product is effected by merely making a mark using spray or the like.

The present invention is made in the light of such foregoing circumstances, and its objective is to provide a production system and a production method of aluminum alloy billet and aluminum alloy billet, which is able to increase the degree of freedom of process design and feed back with high accuracy the production information and the inspection results of the aluminum alloy billet to the manufacturing process. Further, the invention is able to reduce the time lag and control the manufacturing condition when the aluminum alloy molten metal is continuously cast and cut in the shape of rod, as individual billet attribute information, in association with an identification mark put on each aluminum alloy billet that is cut into the prescribed length. Furthermore, with the present invention, it is possible to control production history and the inspection results even with a production unit aimed for improvement in efficiency as a manufacturing device of concurrently producing in line, or even with a process across production lines by controlling individual information of the aluminum alloy billet with the production control device. Moreover, the invention achieves much more quality stabilization, efficiency, and operation stabilization of the aluminum alloy billet used for the machining materials, along with the attribute information of each aluminum alloy billet.

In order to solve the above-mentioned problems, an embodiment disclosed herein includes a smelting device for smelting an aluminum allow raw material to produce molten aluminum alloy, a continuous casting device for continuously casting in the shape of rod the molten aluminum alloy smelted by the smelting device, a cutting device for cutting the aluminum alloy billet produced by continuously casting the molten aluminum alloy into a predetermined length, an identification mark marking device for marking an identification mark on the aluminum alloy billet cut by the cutting device, a loading device for loading the aluminum alloy billet on which the identification mark is put in a product carrier container as a product, a speed detector for detecting a pulling speed of the aluminum alloy billet pulled out from the continuous casting device, an inner defect inspection device for inspecting an inner defect in the aluminum alloy billet before being loaded in the product carrier container, a visual inspection device for inspecting an external appearance of the aluminum alloy billet before being loaded in the product carrier container, a billet length measuring device for measuring a length of the aluminum alloy billet cut by the cutting device and a product control device for controlling production of the aluminum alloy billet.

The product control device comprises an operating unit for carrying out an operation of a casting time of a front end and a rear end of the molten aluminum alloy on which the identification mark is put and a smelting time of the molten aluminum alloy based on a detection result obtained by the speed detector and a measurement result obtained by the billet length measuring device, and finding a casting condition of the aluminum alloy billet casted on the casting time; a quality evaluation unit for evaluating whether the aluminum alloy billet is good or bad by comparing the inspection result obtained by the inner defect inspection device, the inspection result obtained by the visual inspection device, and the measurement result obtained by the billet length measuring device with a setting condition set beforehand, and for dispensing out of the system an aluminum alloy billet that is condemned to be a defective product; and a storage unit for storing the smelting condition of the smelting device, the casting condition of the continuous casting device, the evaluation result obtained by the quality evaluation device, the inspection result obtained by the inner defect inspection device, the inspection result obtained by the visual inspection device, and measurement result obtained by the billet length measuring device in association with the identification mark, as production information, quality information, inspection information; and for storing the aluminum alloy billet that is evaluated to be a quality product by the quality evaluation device in association with the identification mark with information loaded in the product carrier container as shipment information of the aluminum alloy billet.

The operating unit carries out an operation of the casting time of the molten aluminum alloy corresponding to the front end and the rear end of the aluminum alloy billet on which the identification mark is put, based on a casting start time of the molten aluminum alloy, the detection result obtained by the speed detector, the measurement result obtained by the billet length measuring device or a setting value of the cut length. The operating unit also carries out an operation of a time when the molten aluminum alloy is conveyed to the continuous alloy billet to a time when the identification mark is put on the aluminum alloy billet based on the detection result obtained by the speed detector.

The operating unit of the production control device caries out an operation of the casting time of the molten aluminum alloy corresponding to the front end and the rear end of the aluminum alloy billet on which the identification mark is put based on the detection result obtained by the speed detector, the measurement result obtained by the billet length measuring device or the setting value of the cutting length, after considering a change in a unit in a molten aluminum alloy transfer passage, and stores the smelting condition of the smelting device at the time in the storage unit in association with the identification mark as production information of the aluminum alloy billet cut by the cutting device.

The production control device includes a feedback signal signaling unit for signaling a feedback control signal to the smelting device and the continuous casting device, the feedback control signal controlling so as not to produce defects on a surface and inside of the aluminum alloy billet by approaching an operating condition of the smelting device and the continuous casting device to the setting condition set beforehand based on the inspection results obtained by the inner defect inspection device and the visual inspection device.

A heat treatment device can be used for applying heat treatment processing to the aluminum alloy billet on which the identification mark is put.

The production control device stores the heat treatment condition of the heat treatment device in the storage unit in association with the identification mark as the production information of the aluminum alloy billet.

A facing device can be used for scraping the surface of the aluminum alloy billet on which the identification mark is put.

The production control device stores a facing condition of the facing device in the storage unit in association with the identification mark as the production information of the aluminum alloy billet.

A surface inspection device can be used for surface inspecting the aluminum alloy billet of which surface is scraped by the facing device. The surface inspection device inspects the surface of the aluminum alloy billet with eddy current inspection or fluorescent penetrant inspection.

The production control device stores the inspection result obtained by the surface inspection device in the storage unit in association with the identification mark as inspection information of the aluminum alloy billet.

The identification mark is put on a unit of the aluminum alloy billet cut by the cutting device.

The inner defect inspection device inspects whether there is an inner defect in the aluminum alloy billet before the identification mark is put thereon.

The production control device carries out an operation of an inspection time of the aluminum alloy billet inspected by the inner defect inspection device before putting the identification mark thereon based on the inspection start time of the molten aluminum alloy, the detection result obtained by the speed detector, and measurement result obtained by the billet length measuring device; and stores the inspection time of the aluminum alloy billet in the storage unit in association with the identification mark as inspection information of the aluminum alloy billet.

The storage unit is a nonvolatile storage device. The speed detector includes a measure for measuring a consecutive length of the aluminum alloy billet and a timing device for measuring a time from a time when the aluminum alloy billet is casted to a time when the billet is cut by the cutting device.

The timing device is a timer built in the product control device. The continuous casting device is a vertical continuous casting device. The identification mark is put on the aluminum alloy billet after reforming the surface of the aluminum alloy billet.

The identification mark is put on the aluminum alloy billet after elastically deforming the surface of the aluminum alloy billet. The identification mark marking device is a laser marker or a stumping marker. The inner defect inspection by the inner defect inspection device is conducted to the aluminum alloy billet before being cut by the cutting device.

The inner defect inspection device inspects the inner defect of the aluminum alloy billet with ultrasonic flaw inspection or x-ray flaw inspection. The continuous casting device includes a cooling pool for cooling down the aluminum alloy billet with cooling water.

The inner defect inspection device includes an ultrasonic probe facing in a noncontact manner to the aluminum alloy billet inside the cooling pool. The ultrasonic probes are provided inside the cooling pool, and arranged in a mutually different direction within a normal vector surface of the pulling direction of the aluminum alloy billet.

A flow rate of the cooling water can be between the aluminum alloy billet and the ultrasonic probe is less than 0.1 m/sec. The billet length measuring device is installed just after the cutting device.

Any of one or more devices of the smelting device, the continuous casting device, the inner defect inspection device, the visual inspection device, the heat treatment device, the facing device, and the surface inspection device is arranged in parallel in plural lines in the pulling direction of the aluminum alloy billet. A control signal to allocate the molten aluminum alloy or the aluminum alloy billet to the devices is arranged in parallel in plural lines in the pulling direction of the aluminum alloy billet.

The production control device stores the production information of a line involved in the production of the aluminum alloy billet in the storage unit in association with the identification mark.

The embodiments disclosed herein allow storing in the storage unit of the production control device in association with the production information and the inspection information of the aluminum alloy billet based on an identification mark put on the aluminum alloy billet. This enables arrangement of the inner defect inspection device, the billet length measuring device, the facing device, and the surface inspection device and the like at an appropriate position, respectively, even when efficient production is attempted through more than one or two plural parallel production lines. Thus, a small time lag occurs when feeding back the inspection results obtained by each inspection device to the relevant processes, which traces production and inspection histories even with the production process across the manufacturing lines. The production system is capable of improving efficiency, enabling precise quality evaluation of the product, and avoiding defective products from forwarding to the succeeding devices that processes a post-process, thus accomplishing much more quality stabilization of the aluminum alloy billet and production of the aluminum alloy billet used as machining materials with consistent quality.

Furthermore, even in the case where at least one of the smelting device, the continuous casting device, the inner defect inspection device, the visual inspection device, the billet length measuring device, the squareness inspection device, the straightness inspection device, the heat treatment device, the facing device, the surface inspection device, and the defective product dispensing device are arranged in parallel in plural lines in a pulling direction of the aluminum alloy billet, the aluminum alloy molten metal or the aluminum alloy billet can be properly allocated to the plural devices installed in parallel in plural lines, thereby effectively producing the aluminum alloy billet used as the machining materials. Even in that case, uniformly controlling the production information of the manufacturing device involved in production of the aluminum alloy billet actualizes precise feedback of the casting condition and the inspection results with a small time lag. Moreover, it makes it possible to establish an association between the production information and the inspection results for every production billet, which effectively produces the aluminum alloy billet used as the machining materials with consistent quality.

BRIEF DESCRIPTION OF THE DRAWINGS

The various features, advantages and other uses of the present apparatus will become more apparent by referring to the following detailed description and drawing in which.

DESCRIPTION OF EMBODIMENTS

Figure 1:
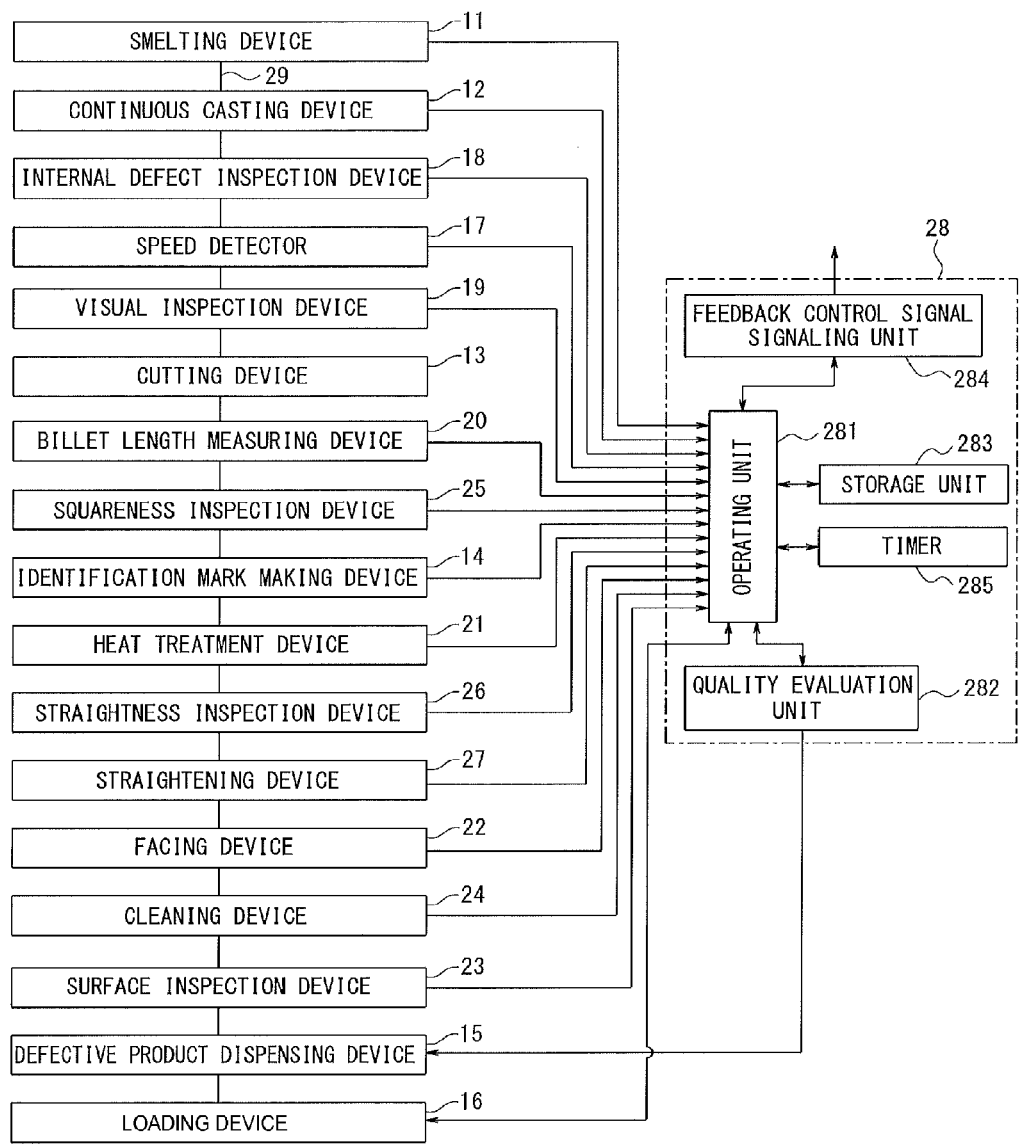
FIG. 1 is a view schematically illustrating a schematic structure of the production system according to one embodiment of the present invention.

Hereinafter, a description will be made to embodiments of the present invention with reference to the accompanying drawings. Referring to FIG. 1, the aluminum alloy billet production system according to one embodiment includes a smelting device 11, a continuous casting device 12, a cutting device 13, an identification mark making device 14, a defective product dispensing device 15, a loading device 16, a speed detector 17, an inner defect inspection device 18, a visual inspection device 19, a billet length measuring device, a heat treatment device 21, a facing device 22, a surface inspection device 23, a cleaning device 24, a squareness inspection device 25, a straightness inspection device 26, a straightening device 27, and a production control device 28.

The smelting device 11 is for smelting a raw material of aluminum alloy to produce molten aluminum alloy. The temperatures and alloy contents in the raw material of the aluminum alloy smelted by the smelting device 11 are controlled. Further, the materials are conveyed to the continuous casting device 12 as molten aluminum alloy after a dissolved gas or an inclusion is removed, if needed. Alternatively, the smelting device 11 may continuously smelt the molten metal utilizing a continuous smelting furnace and may have plural smelting furnaces (not shown) to smelt the molten aluminum alloy by alternately operating these smelting furnaces.

As a smelting furnace of the smelting device 11, it may adopt a tilting reverberatory furnace. It is preferable to control the temperature and content of the raw material after it is evenly smelted in the melting furnace and to perform flux treatment to increase clearness of the molten metal, as necessary. It is also possible to add a refiner made of either primary silicon or grains to the smelting furnace for refining the texture of the aluminum alloy billet, or to consecutively add the refiner in a molten metal transferring between the smelting device 11 and the continuous casting device 12. Further, as a method of removing the dissolved gas in the molten aluminum alloy, the dissolved gas can be removed by a degasification device provided in an in-line arrangement between the smelting device 11 and the continuous casting device 12. In the meantime, as a method of removing the inclusion in the molten aluminum alloy, the inclusion may be removed by a filter provided in an in-line arrangement between the smelting device 11 and the continuous casting device 12.

The raw material of aluminum alloy are smelted in this way and the resulting molten aluminum alloy on which ingredient, cleanness, temperature, and refining treatment are controlled is conveyed to the continuous casting device 12 through a molten metal transfer passage, such as a gutter.

Figure 2:
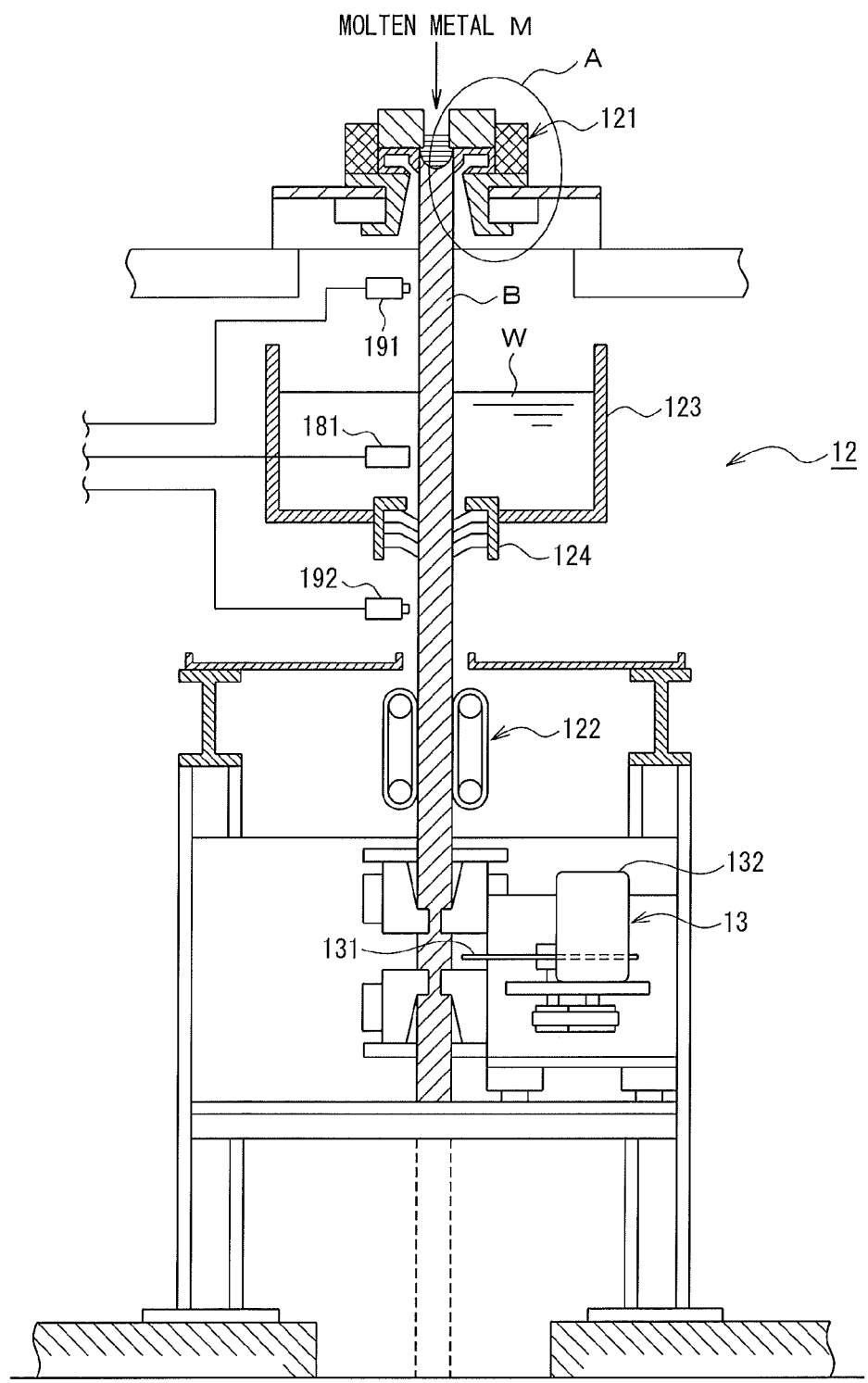
FIG. 2 is a longitudinal sectional view showing one example of the continuous casting device shown in FIG. 1.
Figure 3:
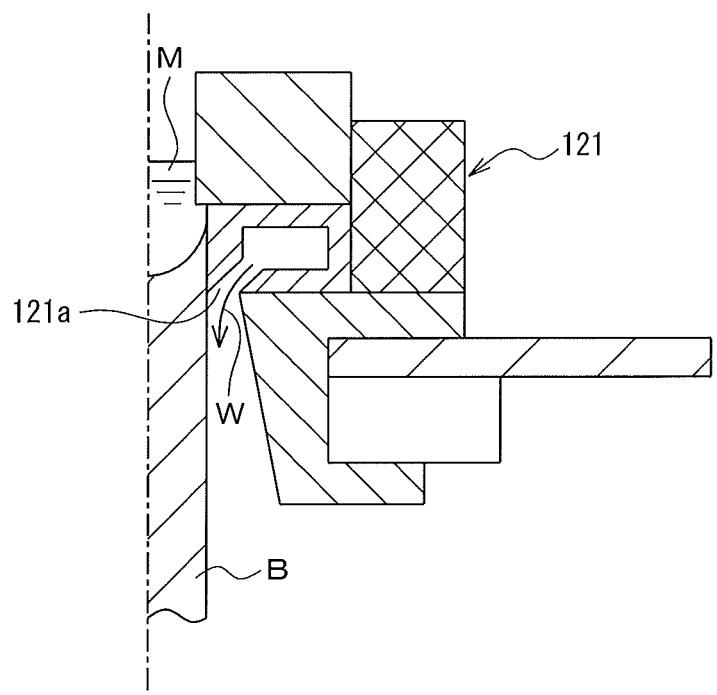
FIG. 3 is an enlarged view of the structure of part A shown in FIG. 2.

The continuous casting device 12 is for continuously casting in the shape of rod the molten aluminum alloy conveyed from the smelting device 11. As depicted in FIG. 2, the device 12 includes: a water cooling mold 121 for continuously casting the molten aluminum alloy M from the smelting device 11 to a round bar having 30 mm to 208 mm in diameter or to a bar-like billet having another shape while water cooling the molten aluminum alloy M; a cooling pool 123 provided for further cooling with cooling water W aluminum alloy billet B that is casted by the water cooling mold 121 with being spouted from the water cooling mold 121, and for inspecting the billet with ultrasonic probe inspection; a draining 124 for stopping a gush of the cooling water W from the cooling pool 123 and evacuating the cooling water W from the aluminum alloy billet B. The water cooling mold 121 is provided with plural cooling water spouting holes 121a (see FIG. 3). They are configured such that the molten aluminum alloy M passing through within the water cooling mold 121 is cooled down by the cooling water W gushed from the plural cooling water spouting holes 121a to be coagulated in the shape of rod.

The continuous casting device 12 can be a vertical continuous casting device where the casted aluminum alloy billet is pulled out downwardly from the water cooling mold 121. The molten metal conveyed from the smelting device 11 is coagulated in the shape of rod in the continuous casting device 12. And so, it is desirable to equalize the supply amount with the casting amount casted by the continuous casting device utilizing the same amount of molten metal in which the same molten metal is used so that a molten metal surface level in the mold of the continuous casting device 12 is kept at an appropriate height. In the case where a tilting reverberatory furnace is adopted for the smelting furnace, the supply amount of the molten metal is adjusted by varying a tilting angle, whereas in the case where a stationary reverberatory furnace is adopted for the smelting furnace, the supply amount of the molten metal is adjusted by adjusting a cross-section of a tap hole.

The cutting device 13 is for cutting into a predetermined length the aluminum alloy billet B that is produced by continuously casting the molten aluminum alloy in the shape of rod. As depicted in FIG. 2, the device 13 is equipped with a discoidal rotary cutter 131 to cut the aluminum alloy billet B. Additionally, the cutting device 13 is also equipped with a cutter driving motor 132 to rotationally drive the rotary cutter 131. The cutter driving motor 132 and the rotary cutter 131 are designed to be movable in the width direction of the aluminum alloy billet B in synchronization with a pulling mechanism 122 of the continuous casting device 12.

The identification mark making device 14 is for making an identification mark on the aluminum alloy billet cut by the cutting device 13. The identification mark to be made by the identification mark making device 14 on the aluminum alloy billet is supplied to the production control device 28 as identification information of the aluminum alloy billet to be shipped as a product.

Since no particular limitations are put on how to make an identification mark on the aluminum alloy billet, various kinds of methods of making the identification mark may be available. One of which is a method of making an identification mark by reforming the surface of the aluminum alloy billet (e.g., a laser marker method of irradiating a laser beam such as $CO_2$ laser and YAG laser on the surface of the aluminum alloy billet, and reforming the surface of the aluminum alloy billet with thermal energy of the laser beam for making the identification mark thereon), or a method of making an identification mark by elastically deforming the surface of the aluminum alloy billet (e.g., an impact dot matrix method of colliding a stylus against the surface of the aluminum alloy billet and making an identification mark on the surface of the aluminum alloy billet with an impact force thereof).

When an identification mark is to be made on the aluminum alloy billet, it is preferable to make the identification mark (e.g., a character, a barcode, a 2D code) readable by an optical character reader. In the case where the identification mark made on the aluminum alloy billet is the barcode, JAN, standard ITF, CODE-128, CODE-39, CODABAR (NW-7) can be suitably applied. In the case where the identification mark is the 2D code, the stuck type including PDF 417, Code 49, Code 16k, Coda Block, or the matrix type including Code One, Data Code, Array Tag, QR Code, Box Graphic Code, Maxi Code, Veri Code, Soft Strip, CP Code, Carra Code, and Ultra Code may be suitably applied.

Although no particular limitations are put on portions to which an identification mark is to be made, it is preferable to make the identification mark on the unit of the aluminum alloy billet cut by the cutting device 13, as the identification mark does not disappear when the surface (side) of the aluminum alloy billet cut by the cutting device 13 is scraped by the facing device 22.

The defective product dispensing device 15 is for dispensing out of the system those other than the aluminum alloy billet that is evaluated to be a quality product by the quality evaluation unit 282 of the production control device 28, as will be mentioned below. The aluminum alloy billet successfully passed through the defective product dispensing device 15 is loaded as a product into the product carrier container with the loading device 16.

The loading device 16 is for loading the aluminum alloy billet on which the identification mark that has been made by the identification mark making device 14 into the product carrier container, in response to an quality product determination instruction send from the production control device 28 (information when the production control device 28 evaluates as a quality product). A loading timing of the aluminum alloy billet and the number of the product carrier container are supplied as the shipment information from the loading device 16 to the production control device 28.

The product carrier container has a mark thereon for identification. The product carrier container may be employed, as far as it has a shape endurable to carry the aluminum alloy billet such that the billet is placed vertically on a pallet and the container has a guide to which one or plural pieces of billet are secured or the container is formed of a guide jig for piling up the pieces of billet horizontally on the pallet.

The speed detector 17 is for detecting a pulling speed of the aluminum alloy billet to be pulled out from the water cooling mold 121 of the continuous casting device 12. The speed detector 17 includes a measure to measure the continuous length of the aluminum alloy billet, although it is not shown. Further, the speed detector 17 includes a timer to measure the time from when the aluminum alloy billet is cast to when the billet is cut by the cutting device 13. The pulling speed detected by the speed detector 17 and the billet length are supplied to the production control device 28 as the pulling speed and length information of the aluminum alloy billet.

The inner defect inspection device 18 is for inspecting inner defects such as a casting defect of the aluminum alloy billet casted by the continuous casting device 12, with the ultrasonic flaw inspection or the X-ray flaw inspection. The inspection results obtained by the inner defect inspection device 18 are supplied to the production control device 28 as inspection information of the aluminum alloy billet to be shipped as a product.

The inner defect inspection by the inner defect inspection device 18 should be conducted during the time from when the aluminum alloy billet is casted to when the billet is loaded into the product carrier container. In consideration that the inspection results obtained by the inner defect inspection device 18 are fed back to the continuous casting device 12 so as to eliminate the inner defects without stopping the casting, it is preferable to conduct the inner defect inspection to the aluminum alloy billet before the cutting device 13 cuts the billet, as the time lag can be reduced.

Moreover, in the case where an inner defect of the aluminum alloy billet is inspected by using the ultrasonic flaw method, it is desirable that the cooling pool 123 should be mounted in the continuous casting device 12 for noise reduction and one or plural ultrasonic probes 181 should be placed inside thereof. In the case where an inner defect of the aluminum alloy billet linearly occurs, it is desirable to place plural ultrasonic probes mutually in a different direction within a normal vector surface in the pulling direction of the aluminum alloy billet, as reflected waves of ultrasonic waves are easily detected. Furthermore, in order to prevent involvement of bubbles in flowing the cooling water W in the cooling pool 123 and suppress the generation of noises arising from the bubbles, it is desirable for pulling direction components of the aluminum alloy billet of a flow rate vector of the cooling water between the aluminum alloy billet and the ultrasonic probes in the cooling pool 123 to be equal to or below 0.1 m/sec.

Meanwhile, in the case where the inner defect inspection device 18 conducts an inner defect inspection to the aluminum alloy billet before an identification mark is put thereon, it is preferable to measure the time from when the inner defect inspection has conducted to when the identification mark is put, and then to provide a measurement time to the production control device 28, together with the inspection results obtained by the inner defect inspection device 18.

The visual inspection device 19 is for inspecting an external appearance of the aluminum alloy billet casted by the continuous casting device 12 with a continuous photography method (a technique of continuously photographing the surface of the aluminum alloy billet to investigate the external appearance through an image analysis of the photographs or through a visual check of a worker). The inspection results and the inspection time by the visual inspection device 19 are supplied to the production control device 28 as inspection information of the aluminum alloy billet that is to be shipped as a product. The visual inspection device 19 includes: a shooting device 191, such as a TV camera, for shooting the aluminum alloy billet B pulled out from the water cooling mold 121; and a shooting device 192, such as a TV camera, for shooting the aluminum alloy billet B that has passed through within the water cooling pool 123 of the continuous casting device 12.

An inspection with the visual inspection device 19 should be conducted during the time from when the aluminum alloy billet is casted to when the billet is loaded into the product carrier container. However, in consideration that the inspection results of the visual inspection device 19 are fed back to the continuous casting device 12, it is more desirable to conduct a visual inspection for the aluminum alloy billet before the billet is cut by the cutting device 13, as the time lag can be reduced.

The billet length measuring device 20 is for measuring the length of aluminum alloy billet cut into a predetermined length with the cutting device 13 by utilizing the laser photometry (a technique of optically measuring the length of a measuring object based on the time from when a laser beam having a constant wavelength is irradiated on a surface of the measured object to when the laser beam that is reflected on the surface of the measured object is received), or a dial gauge or the like. The measurement results obtained by the billet length measuring device 20 are supplied to the production control device 28 as production information of the aluminum alloy billet to be shipped as a product. The billet length measuring device 20 is arranged immediately behind the cutting device 13.

The heat treatment device 21 is for applying heat treatment, such as T5 heat treatment, T6 heat treatment, HO heat treatment, distortion-eliminating heat treatment, to the aluminum alloy billet on which the identification mark is made by the identification mark making device 14. The heat treatment conditions for the heat treatment device 21 are supplied to the production control device 28 as production information of the aluminum alloy billet to be shipped as a product.

As a candidate for a heat treatment furnace of the heat treatment device 21 to give heat treatment to the aluminum alloy billet, a continuous heat treatment furnace and a batch heat treatment furnace may be available. Additionally, as a candidate for a cooled reactor to cool down the aluminum alloy billet subjected to the heat treatment in the heat treatment furnace, a CC furnace and a radiational cooling reactor may be available.

Preferably, the heat treatment conditions of the heat treatment device 21 for the aluminum alloy billet are set beforehand for each use as machining materials depending on the shape, size, and quantity of the aluminum alloy billet, and one of the heat treatment conditions set beforehand depending on the size and the quantity for each use is selected for applying the heat treatment to the aluminum alloy billet.

The facing device 22 is for scraping the surface, except for a cutting surface of the aluminum alloy billet on which an identification mark is made by the identification mark making device 14. A facing condition of the facing device 22 is supplied to the production control device 28 as production information of the aluminum alloy billet to be shipped as a product. Moreover, the facing device 22 is arranged immediately behind the heat treatment device 21. A numerical control turning machine may be used as one aspect of the facing device 22.

The surface inspection device 23 is for inspecting the surface of the aluminum alloy billet, the surface of which is scraped by the facing device 22, using the eddy current crack detection or the fluorescent penetrant inspection. The inspection results obtained by the surface inspection device 23 are supplied to the production control device 28 as inspection information of the aluminum alloy billet to be shipped as a product.

The cleaning device 24 is for applying cleaning treatment to the aluminum alloy billet that is subjected to the facing by the facing device 22. A cleaning condition for the cleaning device 24 is supplied to the production control device 28 as cleaning information of the aluminum alloy billet that has been undergone the cleaning treatment.

The squareness inspection device 25 is for inspecting the squareness of the cutting surface of the aluminum alloy billet cut by the cutting device 13. The inspection results obtained by the squareness inspection device 25 are supplied to the production control device 28, in association with an identification mark made on the billet, as inspection information of the aluminum alloy billet to be shipped as a product. The squareness can be found by measuring a distance from a reference plane that is formed of different three points located on the cutting surface of the aluminum alloy billet and by then performing an arithmetic operation of the plane of the cutting surface to measure a difference from the reference plane.

The straightness inspection device 26 is for inspecting the straightness of the aluminum alloy billet cut by the cutting device 13. The inspection results obtained by the straightness inspection device 26 are supplied to the production control device 28 as inspection information of the aluminum alloy billet to be shipped as a product. The straightening device 27 is for correcting a bend of the aluminum alloy billet. The straightening device 27 is configured to correct the angle of the aluminum alloy billet based on the inspection results obtained by the straightness inspection device 26.

The production control device 28 is for managing the production of the aluminum alloy billet used as a machining material. The production control device 28 includes an operating unit 281 and a quality evaluation unit 282. Based on a passing time taken from the smelting furnace of the aluminum alloy billet on which the identification mark is made to the mold, a casting time of the cutting surface, the detection results obtained by the speed detector 17, the length of the molten metal transfer passage extending from the smelting furnace to the mold, its passage cross-sectional area, and the duration taken from the mold to a cutting start, the operating unit 281 calculates an average time to find a time taken from the mold to the cutting. The operating unit 281 further calculates these times by adding the time taken from the cutting to the making of the identification mark to find a record of the production conditions and the inspection results. On the other hand, the quality evaluation unit 282 compares the inspection results obtained by the inner defect inspection device 18, the measurement results obtained by the visual inspection device 19, and the measurement results obtained by the billet length measuring device 20 with predetermined setting conditions to determine whether or not the aluminum alloy billet is a good product.

The production control device 28 includes a storage unit 283 periodically storing together with a time, the smelting condition of the smelting device 11, and the casting condition and the production information of the continuous casting device 12, and stores them in association with the identification mark as production information of the aluminum alloy billet to be shipped as a product based on the results calculated by the operating unit 281. In addition, the storage unit 283 also stores the results of quality evaluation of the aluminum alloy billet, the heat treatment condition of the heat treatment device 21, and the inspection results supplied from the inner defect inspection device 18, the visual inspection device 19, the billet length measuring device 20, and the surface inspection device 23 in association with the identification mark as quality evaluation information, heat treatment information, and inspection information of the aluminum alloy billet to be shipped as a product. The information stored on the storage unit 283 that the aluminum alloy billet has been evaluated to be a good product is loaded into the product carrier container in association with the identification mark as the shipment information of the aluminum alloy billet. The storage unit 283 is made of a nonvolatile storage.

Furthermore, the production control device 28 further includes a feedback control signal transmission unit 284 and a timer 285. The feedback control signal transmission unit 284 is for transmitting a feedback control signal to the smelting device 11 and the continuous casting device 12 to control so that a defect should not occur on the surface and inside of the aluminum alloy billet, by approaching an operating state of the smelting device 11 and the continuous casting device 12 to a predetermined setting condition, on the basis of the conditions including the temperature, molten metal level, casting temperature, lubricant quantity, gas pressure, mold temperature of the smelting furnace, the production information, and the inspection results obtained by the inner defect inspection device 18 and the visual inspection device 19. The timer 285 is for detecting a mold starting time and an inspection time of the aluminum alloy billet. Moreover, the production control device 28 stores in the storage unit 283 quality product control information beforehand prior to start of the production of the aluminum alloy billet, and in addition, when one or more devices included in the production system are installed to concurrently produce the billet, a serial number is applied to each of the multiple devices that concurrently produce the billet.

Figure 4:
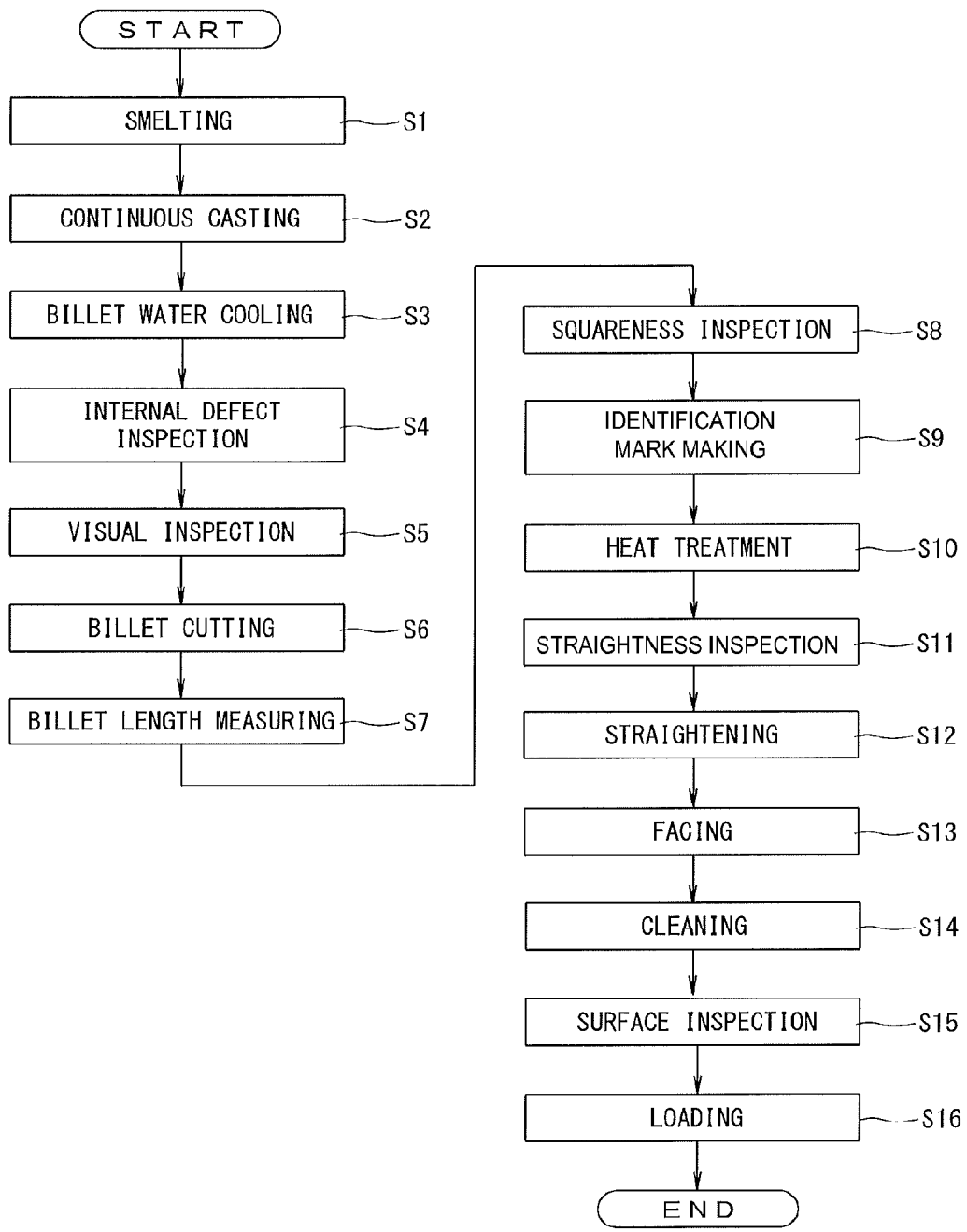
FIG. 4 is a view showing one example of a method for producing the aluminum alloy billet availing itself of the production system of the aluminum alloy billet shown in FIG. 1.

FIG. 4 is a chart showing one example of the method of producing the aluminum alloy billet utilizing the production system of the aluminum alloy billet shown in FIG. 1. When manufacturing an aluminum alloy billet utilizing the production system as shown in FIG. 1, firstly, the raw material of aluminum alloy is smelted by the smelting device 11 to produce molten aluminum alloy (step S1). At that moment, a smelting condition of the smelting device 11 is stored in the storage unit 283 of the production control device 28, as smelting information. Also, at that moment, the production control device 28 feeds back the smelting information of the molten aluminum alloy stored in the storage unit 283 to the smelting device 11 so as to keep a casting defect-free state without stopping the casting based on the casting information and the inspection information, and then controls the smelting device 11 so that the raw material of aluminum alloy has the smelting setting condition set beforehand based on the information fed back from the production control device 28. The smelting setting condition may contain at least one of the conditions, including a molten metal temperature, a molten metal feeding amount, a refiner amount, a filter, and a degassing condition which constitute the smelting conditions.

Then, the molten aluminum alloy produced by smelting the raw material of aluminum alloy is conveyed to the continuous casting device 12, where the molten aluminum alloy is continuously casted in the shape of rod by the water cooling mold 121 therein (step S2). On this occasion, the casting condition of the continuous casting device 12 is stored in the storage unit 283 of the production control device 28, together with a temporary identification mark identical to the identification mark, by the identification mark making device 14 as the casting information of the aluminum alloy billet.

In steps S1 and S2, the production control device 28 changes the smelting condition stored in the storage unit 283 such that the casting defect-free condition should be kept based on the casting information and the inspection information, or such that the casting defect should be eliminated without stopping the casting in the event of the occurrence of the casting defect, and then feeds back the manufacturing condition to the smelting device 11 and the continuous casting device 12 so as to allow for continuous casting while maintaining a normal condition. Additionally, the production control device 28 controls the continuous casting device 12 such that the molten aluminum alloy should have the casting setting condition under which the casting defect set beforehand can be eliminated based on the quality information fed back from the production control device 28. The defect eliminating setting condition may include at least one of the casting condition, the lubricating oil quantity, pressurization of gas pressure, cooling water amount, casting temperature, and meniscus position, which constitute the smelting conditions and the casting conditions.

Subsequently, the molten aluminum alloy continuously cast in the shape of rod by the water cooling mold 121 of the continuous casting device 12 is then pulled out from the water cooling mold 121 by the pulling mechanism 122, as an aluminum alloy billet, and the aluminum alloy billet pulled out from the water cooling device 121 is cooled down within the cooling pool 123 of the continuous casting device 12 (step S3). At this moment, a pulling speed of the aluminum alloy billet pulled out of the water cooling mold 121 by the pulling mechanism 122 is detected by the speed detector 17, and the pulling speed of the aluminum alloy billet detected by the speed detector 17 is stored in the storage unit 283 of the production control device 28, as pulling speed information of the aluminum alloy billet.

Also, in the cooling pool 123 of the continuous casting device 12, an inner defect inspection (ultrasonic flaw inspection) into the aluminum alloy billet pulled out of the water cooling mold 121 is conducted by the inner defect inspection device 18 under the condition that a flow rate of the cooling water W flowing through between the aluminum alloy billet and an ultrasonic probe is set to equal to or below 1 m/sec (step S4). The inspection results obtained at this time are stored in the storage unit 283 of the production control device 28, as inner defect inspection information of the aluminum alloy billet.

The aluminum alloy billet cooled within the cooling pool 123 of the continuous casting device 12 is inspected along its external appearance (surface characteristics) by the visual inspection device 19 (step S5). At this occasion, the inspection results obtained by the visual inspection device 19 are stored in the storage unit 283 of the production control device 28, as visual inspection information of the aluminum alloy billet.

The aluminum alloy billet, the external appearance of which has been inspected by the visual inspection device 19, is conveyed to the cutting device 13, where the billet is cut into a predetermined length (step S6). Then, the aluminum alloy billet cut into the predetermined length by the cutting device 13 is conveyed to the billet length measuring device 20, where the length of the aluminum alloy billet is measured (step S7). At this time, operating results of the measurement results obtained by the billet length measuring device 20 are stored in the storage unit 283 of the production control device 28 by the identification mark making device 14, as cutting length information of the aluminum alloy billet, together with a temporary billet identification mark identical to the identification mark.

The aluminum alloy billet, the cutting length of which has been measured by the length measuring device 20, is conveyed to the squareness inspection device 25, where the squareness of the cutting surface of the aluminum alloy billet is inspected (step S8). At this moment, the inspection results obtained by the squareness inspection device 25 are stored in the storage unit 283 of the production control device 28 by the identification mark making device 14, as squareness inspection information of the cutting surface of the aluminum alloy billet, together with the temporary billet identification mark identical to the identification mark.

The aluminum alloy billet, in which the squareness of the cutting surface has been inspected by the squareness inspection device 25, is conveyed to the identification mark making device 14, where an identification mark is made on the cutting surface of the aluminum alloy billet (step S9). On this occasion, the identification mark made on the aluminum alloy billet is stored in the storage unit 283 of the production control device 28, as identification information of the aluminum alloy billet.

In the production control device 28, a casting start time of the aluminum alloy billet from a front end to a rear end of the aluminum alloy billet is stored in the storage unit 283. The production control device 28 calculates an average speed taken from the casting to the cutting, from the speed detection results obtained by the speed detector 17 and the billet length to the cutting of the aluminum alloy billet, calculates a time difference from the casting to the cutting, and calculates a time difference of each part of the smelting device from cross-sectional area and the length of the molten metal transfer passage. The casting time of the molten aluminum alloy from the front end to the rear end of each of the pieces of aluminum alloy billet on which the identification mark is made, and the time difference of each part of the smelting device are stored in the storage unit 283 for each product, together with the identification mark.

The aluminum alloy billet on which the identification mark is made by the identification mark making device 14 is conveyed to the heat treatment device 21, where the heat treatment is applied (step S10). On this occasion, the production information such as the heat treatment condition of the heat treatment device 21 and the furnace temperature are stored in the storage unit 283 of the production control device 28, together with the time, and the time when the aluminum alloy billet exactly passes through the heat treatment device 21 is stored in the storage unit 283 of the production control device 28, together with the identification mark.

The aluminum alloy billet which has undergone the heat treatment of the heat treatment device 21 is conveyed to the straightness inspection device 26, where the straightness is inspected (step S11). At this moment, the straightness of the aluminum alloy billet inspected by the straightness inspection device 26 is stored in the storage unit 283 of the production control device 28, as straightness inspection information of the aluminum alloy billet.

The aluminum alloy billet, the straightness of which is inspected by the straightness inspection device 26, is conveyed to the straitening device 27, where a bend is corrected (step S12). The straightened aluminum alloy billet is in turn conveyed to the facing device 22. The surface of the aluminum alloy billet is scraped by the facing device 22 by an amount prescribed beforehand (step S13). At this time, the facing condition of the facing device 22 is stored in the storage unit 283 of the production control device 28, as facing information of the aluminum alloy billet, together with the identification mark.

The aluminum alloy billet to which the facing has been applied by the facing device 22 is cleaned by the cleaning device 24 (step S14), and is then conveyed to the surface inspection device 23, where machining scratches, stamping scratches, and casting defects and the like occurred on the surface of the aluminum alloy billet to which the facing has been applied are inspected (step S15). At this moment, the inspection results obtained by the surface inspection device 23 are stored in the storage unit 283 of the production control device 28, as surface inspection information of the aluminum alloy billet for each product to be shipped.

The aluminum alloy billet, the surface of which has been inspected by the surface inspection device 23, is conveyed to the defective product dispensing device 15. The defective product dispensing device 15 dispenses out of the system those other than the quality products based on the evaluations results obtained by the quality evaluation unit 282 of the production control device 28 associated with the identification mark, and then the aluminum alloy billet is conveyed to the loading device 16. The loading device 16 loads the products into the product carrier container for shipment as machining materials for various products (step S16). At this time, the aluminum alloy billet to be loaded into the product carrier container for shipment is stored in the storage unit 283 of the production control device 28, together with an identification sign of the container and the identification mark of the billet.

As stated above, in the storage unit 283 of the production control device 28, the casting information, the inner defect inspection information, the visual inspection information, the cutting length information, the heat treatment information, the facing information, and the shipment time information of the aluminum alloy billet to be loaded into the product carrier container are stored beforehand in association with the identification mark made on the aluminum alloy billet. This eliminates the need for inspection into the surface and the inside of the aluminum alloy billet, before cutting the aluminum alloy billet produced by continuous casting of the molten aluminum alloy in the shape of rod to the predetermined length, unlike known technology. This changes an order of the inspection processes. For example, an inner defect inspection of the aluminum alloy billet may be conducted immediately after the continuous casting, or the measurement of the length of the aluminum alloy billet may be carried out immediately after the cutting process. This shortens the time lag arisen during feedback of the inspection results obtained at each inspection process to the manufacturing process.

As above, the aluminum alloy billet produced by continuously casting in the shape of rod is cut into the predetermined length, and in turn the identification mark is made on the aluminum alloy billet. On the occasion of loading the aluminum alloy billet on which the identification mark is made into the product carrier container for shipment, the casting information, the inner defect inspection information, the visual inspection information, the cutting length information, the heat treatment information, the facing information, the surface inspection information, and the shipment information of the aluminum alloy billet to be loaded into the product carrier container are stored beforehand in the storage unit 283 of the product control system 28, together with identification mark made on the aluminum alloy billet. This enables an integrated quality control of the aluminum alloy billet that is used as the machining materials for automobile parts or aluminum sash. This eliminates the need to manually record in advance in a quality control notebook the quality of the aluminum alloy billet to be loaded into the product carrier container, thereby achieving an easy control of the quality of the aluminum alloy billet to be loaded into the product carrier container.

Further, the operating unit 281 of the production control device 28 determines the details of defects in the billet from the casting information including the molten metal temperature, the molten metal level, the mold temperature, the lubricating oil amount, the gas pressure force, the casting speed, the cooling water quantity of the molten aluminum alloy, and the inspection information including the inner defect inspection information and the visual inspection information. Such pieces of information are fed back to the smelting device 11 and the continuous casting device 12 based on the determination, thereby allowing the production of the aluminum alloy billet with higher quality. This enables stable continuous casting of the aluminum alloy billet as well as consistent quality thereof.

Arrangement of the surface inspection device 23 just after the cutting device 13 permits feedback of the measurement results obtained by the billet length measuring device 20 in a short time to the cutting device 13, thereby achieving the consistent quality of the aluminum alloy billet.

Arrangement of the surface inspection device 23 just after the facing device 22 allows feedback of the inspection results obtained by the surface inspection device 23 in a short time to the facing device 22, thereby achieving the consistent quality of the aluminum alloy billet.

Even when one or more devices included in the production system are installed to produce the billet concurrently in a pulling direction of the aluminum alloy billet, it is possible to allocate the molten aluminum alloy or the aluminum alloy billet to the plural devices to concurrently and effectively produce the aluminum alloy billet used for the machining materials. Even in such a case, the production information of each of the lines involved in the manufacturing of the aluminum alloy billet is managed in an integrated manner, thereby achieving the consistent quality and stable operation.

Herein, it should be noted that the pulling direction of the aluminum alloy billet refers to a direction toward which the continuously produced aluminum alloy billet moves, so the direction is not necessarily the same as one in which the aluminum alloy billet is pulled out by the pulling mechanism 122.

In one embodiment of the present invention mentioned above, the description has been given of the production system including: the cleaning device 24 for cleaning the aluminum alloy billet that has been cut by the cutting device 13; the squareness inspection device 25 for inspecting the squareness of the cutting surface of the aluminum alloy billet; the straightness inspection device 26 for inspecting the straightness of the aluminum alloy billet; and the straightening device 27 for correcting a bend of the aluminum alloy billet. However, it goes without saying that the present invention may also be applied to a production system that does not include the above devices.

One or more devices among the smelting device 11, the continuous casting device 12, the inner defect inspection device 18, the visual inspection device 19, and the heat treatment device 21 may be installed to produce concurrently the billet in the pulling direction of the aluminum alloy billet.

Moreover, in one embodiment of the present invention mentioned above, while the surface of the aluminum alloy billet that has been subjected to the heat treatment of the heat treatment device 21 is scraped by the facing device 22, the heat treatment may be applied by the heat treatment device 21 to the aluminum alloy billet after its surface has been scraped by the facing device 22.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

The invention claimed is:

1. An aluminum alloy billet production system comprising:
a smelting device configured to smelt a raw material of an aluminum alloy to produce molten aluminum alloy;
a continuous casting device configured to continuously cast an aluminum alloy billet in a shape of a rod from the molten aluminum alloy smelted by the smelting device;
a cutting device configured to cut the aluminum alloy billet produced by the continuous casting device into predetermined lengths;
an identification mark making device configured to make an identification mark on the aluminum alloy billet cut by the cutting device;
a loading device configured to load the aluminum alloy billet on which the identification mark has been made out of the production system, as a product;
a speed detector configured to detect a pulling speed of the aluminum alloy billet pulled out of the continuous casting device;
an inner defect inspection device configured to inspect an inner defect in the aluminum alloy billet before being loaded out of the production system;
a visual inspection device configured to inspect an external appearance of the aluminum alloy billet before being loaded out of the production system;
a billet length measuring device configured to measure a length of the aluminum alloy billet cut by the cutting device; and
a production control device configured to control a production of the aluminum alloy billet, the production control device comprising:
an operating unit configured to determine a casting time as an amount of time for casting the aluminum alloy billet on which the identification mark has been made based on a detection result obtained by the speed detector and a measurement result obtained by the billet length measuring device, and finding a casting condition of the aluminum alloy billet casted during the casting time;
a quality evaluation unit configured to evaluate whether the aluminum alloy billet is a quality product or a defective product by comparing an inspection result obtained by the inner defect inspection device, an inspection result obtained by the visual inspection device, and the measurement result obtained by the billet length measuring device with predetermined setting conditions, and to eject from the system an aluminum alloy billet that is evaluated to be the defective product; and a storage unit configured to store, in association with the identification mark, a smelting condition of the smelting device, the casting condition of the continuous casting device, an evaluation result obtained by the quality evaluation unit, the inspection result obtained by the inner defect inspection device, the inspection result obtained by the visual inspection device, and the measurement result obtained by the billet length measuring device, and for storing, in association with the identification mark, information that the aluminum alloy billet that has been evaluated to be the quality product by the quality evaluation unit has been loaded out of the production system, as shipment information of the aluminum alloy billet.

2. The aluminum alloy billet production system according to claim 1, wherein the operating unit determines the casting time based on a casting start time of the molten aluminum alloy, the detection result obtained by the speed detector, and the measurement result obtained by the billet length measuring device; and determines an amount of time from when the molten aluminum alloy is conveyed to the continuous alloy billet to when the identification mark is made on the aluminum alloy billet based on the detection result obtained by the speed detector.

3. The aluminum alloy billet production system according to claim 1, wherein the operating unit stores the smelting condition of the smelting device together with a time in the storage unit in association with the identification mark.

4. The aluminum alloy billet production system according to claim 1, wherein the production control device comprises a feedback signal signaling unit configured to signal a feedback control signal to the smelting device and the continuous casting device to control at least one operating condition of each of the smelting device and the continuous casting device, based on the inspection results obtained by the inner defect inspection device and the visual inspection device, to approach a respective predetermined setting condition.

5. The aluminum alloy billet production system according to claim 1, further comprising a heat treatment device configured to apply heat treatment processing to the aluminum alloy billet on which the identification mark has been made.

6. The aluminum alloy billet production system according to claim 5, wherein the production control device stores a heat treatment condition of the heat treatment device in the storage unit in association with the identification mark.

7. The aluminum alloy billet production system according to claim 1, further comprising a facing device configured to scrape a surface of the aluminum alloy billet on which the identification mark has been made.

8. The aluminum alloy billet production system according to claim 7, wherein the production control device stores a facing condition of the facing device in the storage unit in association with the identification mark.

9. The aluminum alloy billet production system according to claim 7, further comprising a surface inspection device configured to inspect the surface of the aluminum alloy billet that has been scraped by the facing device.

10. The aluminum alloy billet production system according to claim 9, wherein the surface inspection device inspects the surface of the aluminum alloy billet with an eddy current inspection or a fluorescent penetrant inspection.

11. The aluminum alloy billet production system according to claim 9, wherein the production control device stores the inspection result obtained by the surface inspection device in the storage unit in association with the identification.

12. The aluminum alloy billet production system according to claim 1, wherein the identification mark is made on a cut surface of the aluminum alloy billet cut by the cutting device.

13. The aluminum alloy billet production system according claim 1, wherein the inner defect inspection device inspects whether there is an inner defect in the aluminum alloy billet before the identification mark is made.

14. The aluminum alloy billet production system according to claim 13, wherein the production control device determines an inspection time of the aluminum alloy billet inspected by the inner defect inspection device before the identification mark is made based on an inspection start time of the molten aluminum alloy, the detection result obtained by the speed detector, and the measurement result obtained by the billet length measuring device, and stores the inspection time in the storage unit in association with the identification mark.

15. The aluminum alloy billet production system according to claim 1, wherein the storage unit is a nonvolatile storage device.

16. The aluminum alloy billet production system according to claim 1, wherein the speed detector includes a measure configured to measure consecutive lengths of the aluminum alloy billet cut by the cutting device and a timing device configured to measure a time from a time when the aluminum alloy billet is casted to a time when the aluminum alloy billet is cut by the cutting device.

17. The aluminum alloy billet production system according to claim 16, wherein the timing device is a timer built in the production control device.

18. The aluminum alloy billet production system according to claim 1, wherein the continuous casting device is a vertical continuous casting device.

19. The aluminum alloy billet production system according to claim 1, wherein the identification mark is made on the aluminum alloy billet after a surface of the aluminum alloy billet is reformed.

20. The aluminum alloy billet production system according to claim 1, wherein the identification mark is made on the aluminum alloy billet after a surface of the aluminum alloy billet is elastically deformed.

21. The aluminum alloy billet production system according to claim 1, wherein the identification mark making device is a laser marker.

22. The aluminum alloy billet production system according to claim 1, wherein the inner defect inspection by the inner defect inspection device is conducted to the aluminum alloy billet before the aluminum alloy billet is cut by the cutting device.

23. The aluminum alloy billet production system according to claim 1, wherein the inner defect inspection device inspects the inner defect of the aluminum alloy billet with an ultrasonic flaw inspection or an x-ray flaw inspection.

24. The aluminum alloy billet production system according to claim 1, wherein the continuous casting device includes a cooling pool for cooling down the aluminum alloy billet with cooling water.

25. The aluminum alloy billet production system according to claim 24, wherein the inner defect inspection device includes an ultrasonic probe, facing the aluminum alloy billet in a noncontact manner, inside the cooling pool.

26. The aluminum alloy billet production system according to claim 25, wherein a flow rate of the cooling water between the aluminum alloy billet and the ultrasonic probe is equal to or less than 0.1 m/sec.

27. The aluminum alloy billet production system according to claim 1, wherein the billet length measuring device is installed just after the cutting device.

28. An aluminum alloy billet production method of producing an aluminum alloy billet in the aluminum alloy billet production system according to claim 1.

* * * * *